United States Patent
Flaum et al.

(10) Patent No.: US 9,988,057 B2
(45) Date of Patent: Jun. 5, 2018

(54) METHOD AND DEVICE FOR DETERMINING THE MASS OF A MOTOR VEHICLE, AND A MOTOR VEHICLE WITH A DEVICE OF THIS TYPE

(71) Applicant: WABCO GmbH, Hannover (DE)

(72) Inventors: Nikolai Flaum, Hannover (DE); Torsten Wallbaum, Duingen (DE)

(73) Assignee: WABCO GmbH, Hannover (DE)

( * ) Notice: Subject to any disclaimer, the term of this patent is extended or adjusted under 35 U.S.C. 154(b) by 0 days. days.

(21) Appl. No.: 14/892,296

(22) PCT Filed: May 22, 2014

(86) PCT No.: PCT/EP2014/001379
§ 371 (c)(1),
(2) Date: Nov. 19, 2015

(87) PCT Pub. No.: WO2014/187564
PCT Pub. Date: Nov. 27, 2014

(65) Prior Publication Data
US 2016/0121903 A1    May 5, 2016

(30) Foreign Application Priority Data
May 24, 2013   (DE) .................. 10 2013 008 839

(51) Int. Cl.
*B60W 40/13*    (2012.01)
*B60W 30/02*    (2012.01)

(52) U.S. Cl.
CPC ............ *B60W 40/13* (2013.01); *B60W 30/02* (2013.01); *B60W 2400/00* (2013.01);
(Continued)

(58) Field of Classification Search
CPC .. B60W 30/02; B60W 40/13; B60W 2400/00; B60W 30/03
See application file for complete search history.

(56) References Cited

U.S. PATENT DOCUMENTS 6,446,024 B1    9/2002   Leimbach et al.
2005/0065695 A1*   3/2005   Grieser .................. B60T 8/172
701/70

(Continued)

FOREIGN PATENT DOCUMENTS

DE       4228413 A1    3/1994
DE     197 28 769 A1   1/1999
(Continued)

*Primary Examiner* — Yonel Beaulieu
*Assistant Examiner* — Martin A Weeks
(74) *Attorney, Agent, or Firm* — Brinks Gilson & Lione

(57) ABSTRACT

A method for determining the mass m of a motor vehicle, in particular a commercial vehicle, is based on the principles of power mechanics. In order to determine the vehicle mass in a simple way as accurately as possible while driving, a speed v of the motor vehicle is determined and a drive power $P_A$ of the motor vehicle is determined. The mass m of the motor vehicle can then be determined from the speed v and the drive power $P_A$. A device applies such a method, and a motor vehicle includes such a device.

11 Claims, 2 Drawing Sheets

(52) U.S. Cl.
CPC .............. *B60W 2510/0638* (2013.01); *B60W 2510/0666* (2013.01); *B60W 2510/0695* (2013.01); *B60W 2520/10* (2013.01); *B60W 2530/16* (2013.01)

(56) References Cited

U.S. PATENT DOCUMENTS

| | | | |
|---|---|---|---|
| 2008/0243334 A1* | 10/2008 | Bujak | ................ B60G 17/0165 701/37 |
| 2008/0249693 A1 | 10/2008 | Kresse | |
| 2009/0037047 A1* | 2/2009 | Hawkins | ............... B60W 10/02 701/36 |
| 2009/0171524 A1* | 7/2009 | Pitzal | ................. B60G 17/0185 701/31.4 |
| 2011/0066322 A1 | 3/2011 | Karlsson et al. | |
| 2013/0124077 A1 | 5/2013 | Kim et al. | |

FOREIGN PATENT DOCUMENTS

| | | |
|---|---|---|
| DE | 198 37 380 A1 | 2/2000 |
| DE | 103 07 511 A1 | 9/2004 |
| WO | WO 93/18375 A1 | 9/1993 |

\* cited by examiner

METHOD AND DEVICE FOR DETERMINING THE MASS OF A MOTOR VEHICLE, AND A MOTOR VEHICLE WITH A DEVICE OF THIS TYPE

TECHNICAL FIELD OF THE INVENTION

The invention relates to a method for determining the mass of a motor vehicle, in particular a commercial vehicle, and to a device for executing such a method. The invention further relates to a motor vehicle having such a device for determining the mass of the motor vehicle.

BACKGROUND OF THE INVENTION

It is known to equip motor vehicles, in particular commercial vehicles, with systems for controlling and/or regulating the driving dynamics such as, for example, an electronic stability system (ESP) or an electronically controlled braking system (EBS), in the case of which the mass of the motor vehicle is used as a control parameter.

Since motor vehicles, in particular commercial vehicles, have a large load variance between empty and fully loaded vehicles, an overall mass determination based on estimation is not accurate enough. As a rule, however, no sensors are available for determining the vehicle mass. Consequently, the current vehicle mass must be estimated on the basis of calculation using suitable algorithms.

In order to determine the vehicle mass, it is known to determine the mass m from the equation of motion according to Newton's second law:

$$m*a = F_A - F_L - F_R - F_{St} \qquad (1).$$

Here, m is the total vehicle mass, a the vehicle acceleration, $F_A$ the driving force, $F_L$ the air resistance, $F_R$ the rolling resistance and $F_{St}$ the slope resistance.

However, it is disadvantageous that the slope angle α of the roadway is usually not known for the determination of the slope resistance $F_{St}$. Furthermore, to calculate the driving force $F_A$ it is necessary to know the drivetrain transmission ratio, which in turn presupposes knowledge of the gearbox transmission ratio and axle drive ratio.

SUMMARY OF THE INVENTION

The invention is therefore based on the object of providing a method and a device for the purpose of determining the vehicle mass as accurately as possible in a simple way during driving.

The invention achieves said object with the aid of the features of the method for determining the mass of a motor vehicle, with the aid of a device for determining the mass of a motor vehicle, and with the aid of a motor vehicle as described below.

The method according to the invention for determining the mass (m) of a motor vehicle, in particular a commercial vehicle, is based on the principles of power mechanics and is distinguished in that a speed (v) of the motor vehicle and a drive power ($P_A$) of the motor vehicle are determined. The mass (m) of the motor vehicle is then determined from the speed (v) and the drive power ($P_A$).

Furthermore, the invention achieves the above named object with the aid of a device for determining the mass m of a motor vehicle, in particular a commercial vehicle, having suitable means for determining the speed v of the motor vehicle, and having suitable means for determining the drive power $P_A$ of the motor vehicle. Furthermore, the device according to the invention has calculating means for determining the mass m of the motor vehicle from the speed v and the drive power $P_A$.

Also provided here is the use of such a device comprising means for determining the speed v of the motor vehicle, means for determining the drive power $P_A$ of the motor vehicle and, if appropriate, means for determining the power $P_R$ for overcoming the driving resistances of the motor vehicle and calculating means for determining the mass m of the motor vehicle as a device for determining the mass m of a motor vehicle, in particular a commercial vehicle.

Finally, the invention further achieves the above named object with the aid of a motor vehicle, in particular a commercial vehicle, which has a device according to the invention for determining the mass m of the motor vehicle and/or means for carrying out the steps of the method according to the invention.

A preferred embodiment of the invention is based on the principles of power mechanics which specify that the sum of all powers acting on a system is equal at every instant to the temporal change of the kinetic energy of the system:

$$\frac{d}{dt}E_{kin} = P_A - P_R, \qquad (2)$$

$E_{kin}$ being the kinetic energy, $P_A$ the drive power and $P_R$ the power for overcoming the driving resistances of the motor vehicle.

In this case, the kinetic energy $E_{kin}$ is the sum of the translational energy and the rotational energy. The translational energy is the energy which an object acquires on account of its movement, and can be described by the speed v and the mass m of the moving object. The rotational energy is the energy of an object which rotates about an axis, and can be described by the moment of inertia J and the angular velocity ω:

$$E_{kin} = \frac{1}{2}m*v^2 + \frac{1}{2}J*\omega^2. \qquad (3)$$

In order to determine the mass m of the motor vehicle, Equation (3) is substituted in Equation (2) and solved for m. Here, the mass of the motor vehicle is understood as the total vehicle mass including a load and one or more occupants.

In the context of the method for determining the mass m of a motor vehicle in accordance with the invention, the speed v of the motor vehicle is determined. Furthermore, the drive power $P_A$ and the power $P_R$ for overcoming driving resistances are determined. The mass m of the motor vehicle is determined in accordance with Equations (2) and (3) with the aid of the speed v of the motor vehicle, the drive power $P_A$ and the power $P_R$ for overcoming driving resistances.

In accordance with a preferred embodiment of the invention, the speed v of the motor vehicle is determined by a measured wheel rotational speed signal n. It is thereby advantageously possible to determine the speed v of the motor vehicle by recourse to an available measuring system, since the wheel rotational speed n is likewise required necessarily for other vehicle dynamics control systems such as, for example, ABS control. It is advantageously possible easily to determine the speed v of the motor vehicle on the basis of the data provided by said sensors anyway.

In a further preferred embodiment of the invention, the drive power $P_A$ of the motor vehicle is determined as follows:

$$P_A = (M_{eng} - M_{fric}) * \omega_{eng} * \eta \quad (4),$$

$P_A$ being the drive power, $M_{eng}$ being the drive torque of the engine, $M_{fric}$ being the frictional torque of the engine, $\omega_{eng}$ being the angular velocity of the engine, and $\eta$ being the parameterized efficiency of the drivetrain.

The drive power $P_A$ can therefore advantageously be determined via an engine torque model which is made available by a modern engine controller.

In accordance with a further preferred embodiment of the invention, the power $P_R$ for overcoming the driving resistances is determined from the sum of the individual driving resistances $\Sigma F_{res}$ multiplied by the speed v of the motor vehicle:

$$P_R = (F_L + F_R + F_{St}) * v = \Sigma F_{res} * v \quad (5).$$

The air resistance $F_L$ of the motor vehicle can be determined as follows:

$$F_L = \frac{1}{2} c_w * \rho_{Luft} * A * v^2. \quad (6)$$

Here, $c_w$ is the coefficient of air resistance, $\rho_{Luft}$ the air density, A the front face of the vehicle and v the speed of the vehicle. Plausible approximate values are used for the coefficient of air resistance $c_w$ and the air density $\rho_{Luft}$. The speed v can be determined with the aid of the measured wheel rotational speed n, and the front face A of the vehicle is stored as a vehicle parameter.

The rolling resistance $F_R$ of the motor vehicle can be determined as follows:

$$F_R = \mu * m * g \quad (7).$$

Here, $\mu$ is the coefficient of rolling resistance, g the gravitational constant and m the mass of the vehicle. Again, plausible approximate values are used for the coefficient of rolling resistance $\mu$ and the gravitational constant g.

The slope resistance $F_{St}$ can be determined as follows:

$$F_{St} = m * g * \sin \alpha \quad (8).$$

Here, $\alpha$ is the slope angle, g the gravitational constant and m the mass of the vehicle. The slope resistance can be disregarded in the case of a flat roadway, and so the power $P_R$ for overcoming the driving resistances can advantageously be determined without additional sensors.

In the case of an inclined roadway, however, the power $P_R$ for overcoming the driving resistances includes a substantial slope resistance $F_{St}$ which has to be taken into account in the calculation of the mass m.

However, if the individual driving resistances $F_L$, $F_R$, $F_{St}$ are not known, in particular the slope resistance $F_{St}$, the mass m can be determined by considering two different instants $t_0$, $t_1$. If the two instants $t_0$, $t_1$ are as near to one another as possible, the driving resistances $F_L$, $F_R$, $F_{St}$ are substantially identical.

A further preferred embodiment of the invention therefore provides for determining the speed v of the motor vehicle and the drive power $P_A$ of the motor vehicle for two different instants $t_0$, $t_1$, in particular ones succeeding each other rapidly. Here, the time interval between the two instants $t_0$, $t_1$ is selected in such a way that the sums of the driving resistances $\Sigma F_{res}$ of the vehicle at said two instants $t_0$, $t_1$ (as well as the individual driving resistances at the two instants) do not differ significantly from one another.

The mass m of the motor vehicle is then determined from the speeds, $v_0$, $v_1$ and the drive powers $P_{A0}$, $P_{A1}$ at the two instants $t_0$, $t_1$:

$$t_0: \frac{1}{2} m * \frac{d}{dt} v_0^2 = P_{A0} - \frac{d}{dt} E_{rot0} - \sum F_{res} * v_0 \quad (9)$$

$$t_1: \frac{1}{2} m * \frac{d}{dt} v_1^2 = P_{A1} - \frac{d}{dt} E_{rot1} - \sum F_{res} * v_1.$$

It is thereby possible to minimize the number of unknowns, and advantageously to determine the mass m of the motor vehicle by substituting one equation in the other equation as follows:

$$m = \frac{2 * \left(P_{A1} - \frac{d}{dt} E_{rot1} - \frac{v_1}{v_0}\left(P_{A0} - \frac{d}{dt} E_{rot1}\right)\right)}{\left(\frac{d}{dt} v_1^2 - \frac{v_1}{v_0} * \frac{d}{dt} v_0^2\right)}. \quad (10)$$

In accordance with a further preferred embodiment of the invention, the mass m of the motor vehicle is determined with the aid of a recursive estimation algorithm. Said algorithm calculates one or more output variables recursively as a function of a plurality of input variables, the output variables approaching the optimum values in stepwise fashion. It is thereby advantageously possible to estimate the state of a dynamic system from a sequence of incomplete and noisy data.

The initial value for the desired vehicle mass m is preferably taken to be the value m of the vehicle mass determined and/or estimated in the last carrying out of the recursive estimation algorithm. However, it is also possible to stipulate other values, which lie within the bounds of the value range respectively to be expected.

The speed v and the drive power $P_A$ of the motor vehicle are determined more than twice, in particular regularly at predetermined intervals, and the motor vehicle mass m is determined via the recursive estimation algorithm. This advantageously increases the accuracy of the motor vehicle mass m to be determined.

In a further preferred embodiment of the invention, the recursive estimation algorithm is carried out by means of a Kalman filter or by means of a least squares estimator (RLS filter). Said filters are advantageously distinguished by a low resource demand and can therefore be implemented in a computer device with a low arithmetic capability.

In accordance with a further embodiment of the invention, a mean value of the vehicle mass $\hat{m}$ is determined in order to increase the accuracy of the estimated mass m of the motor vehicle. To this end, the determined value of the mass m is buffered. When at least three measured values of the mass m are available, the mean value $\hat{m}$ is determined by taking account of the variance:

$$\hat{m} = \frac{\sum \frac{m_i}{\sigma_i^2}}{\sum \frac{1}{\sigma_i^2}}, \quad (11)$$

$m_i$ being the ith measured value of the mass m, and $\sigma_i$ being the variance belonging to said measured value $m_i$.

In order advantageously to detect outliers when determining the estimated mass m, a check is firstly made as to whether an individual value of the determined mass m differs by more than a prescribed limit value from the mean value $\hat{m}$ calculated temporarily from a plurality of, in particular three estimated values. In this case, said value is excluded from the further calculation. For example, it can happen that the estimated value for the mass of a motor vehicle differs greatly from the actual mass owing to frequent changes in the roadway slope, or because of strongly distorted calculated signals resulting from tensions of the drivetrain upon startup.

Furthermore, a computer program is provided which has software code sections with instructions for executing a method described above on a processor. In this case, the processor is preferably a microprocessor in a controller of the motor vehicle.

The device according to the invention for determining the mass m of a motor vehicle, in particular a commercial vehicle, has suitable means for determining the speed v of the motor vehicle, suitable means for determining the drive power $P_A$ of the motor vehicle and, if appropriate, suitable means for determining the power $P_R$ for overcoming the driving resistances of the motor vehicle. Furthermore, the device according to the invention has calculating means for determining the mass m of the motor vehicle from the speed v, the drive power $P_A$ and, if appropriate, the power $P_R$ for overcoming the driving resistances of the motor vehicle. Such a device can be a central or separate controller, or can be provided in systems for controlling the driving dynamics such as, for example, ESP, or braking systems such as, for example, EBS.

By way of example, a measuring device for measuring the wheel rotational speed n can be provided as means for determining the speed v of the motor vehicle.

By way of example, the means for determining the drive power $P_A$ determine the drive power $P_A$ in accordance with Equation (4) from the drive torque of the engine $M_{eng}$, the frictional torque of the engine $M_{fric}$ and the measured angular velocity of the engine $\omega_{eng}$.

Also provided if appropriate are means for determining the power $P_R$ for overcoming the driving distances which take account in accordance with Equation (5) the air resistance, the rolling resistance and the slope resistance.

In the case when the power $P_R$ for overcoming the driving resistances cannot be determined, for example owing to an unknown slope angle $\alpha$ of the roadway, the device according to the invention is configured in such a way as to determine the speed v of the motor vehicle and the drive power $P_A$ of the motor vehicle at two instants $t_0$, $t_1$ following each other closely in time.

According to equation (10), a calculating means of the device according to the invention determines the mass m of the motor vehicle, since the driving resistances $F_L$, $F_R$, $F_{St}$ at the two instants $t_0$, $t_1$ can be taken as approximately equal when the two instants $t_0$, $t_1$ are as close to one another as possible.

In accordance with a preferred embodiment of the invention, the calculating means according to the invention is configured in such a way as to determine the vehicle mass m with a recursive estimation algorithm. As a result, the accuracy in the determination of the mass m of the motor vehicle is advantageously increased, since the mass m is approximated to an optimum value on the basis of the recursive estimation algorithm.

In a further preferred embodiment of the invention, the recursive estimation algorithm is a least squares algorithm (RLS algorithm) or a Kalman algorithm.

In a further embodiment of the invention, means are provided for determining a mean value $\hat{m}$ from at least three different measured values of the mass m of the motor vehicle, the respective variance of the measured value being taken into account when forming the mean value. It is preferred to use the reciprocal of the variance in this case as a weighting factor.

In order advantageously to avoid the mean value $\hat{m}$ being corrupted by any possible outliers, the device according to the invention has means for checking whether a measured value deviates from the temporarily determined mean value $\hat{m}$ by more than a prescribed limit value. Outliers recognized in such a way are advantageously not taken into account in the determination of the value to be output for the mass m of the motor vehicle.

BRIEF DESCRIPTION OF THE DRAWINGS

Further embodiments of the invention are evident from the exemplary embodiments explained in more detail with the aid of the drawing, in which.

DETAILED DESCRIPTION OF THE DRAWINGS

Figure 1:
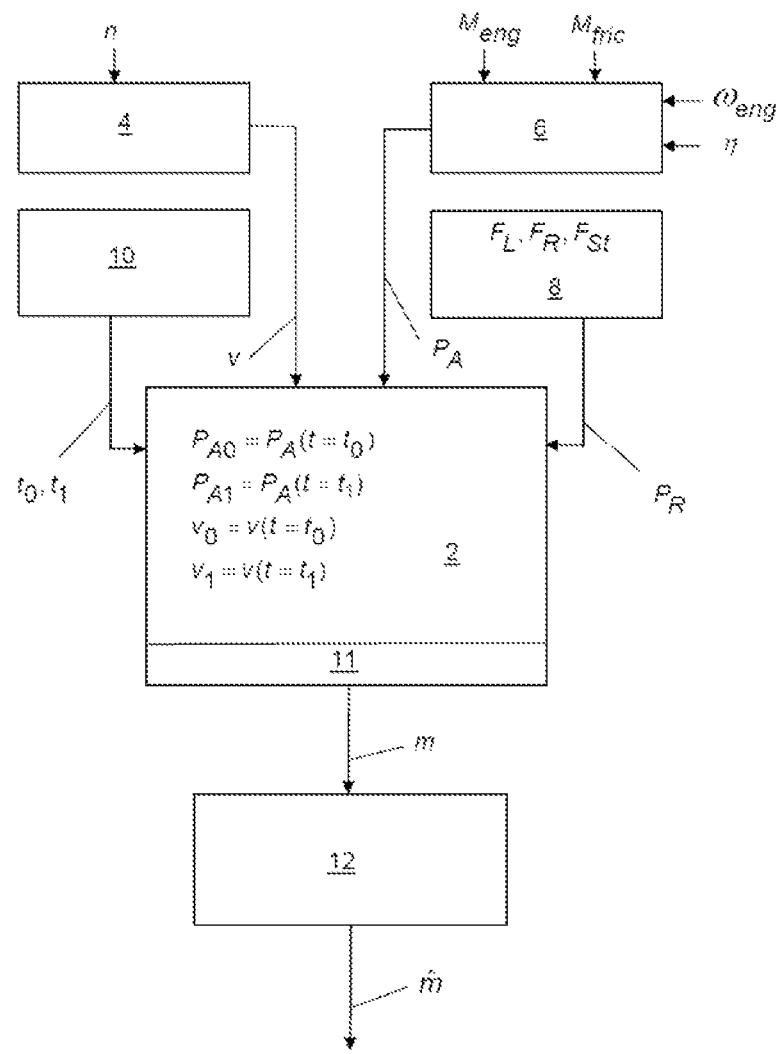
FIG. 1 shows a block diagram for explaining the method according to the invention for determining the mass of a motor vehicle.

FIG. 1 shows a block diagram for explaining the method according to the invention for determining the mass m of a motor vehicle. Calculating means 2 which determine a mass m of the motor vehicle with the aid of a plurality of input variables are provided for carrying out the method.

Firstly means 4 for determining the speed v and also means 6 for determining the drive power $P_A$ are provided for the input variables required for determining the mass m. It is possible in this case to use any desired procedure to determine the required input variables within the scope of the present invention.

In contrast to conventional methods for determining the mass m of a motor vehicle, it is the principles of power mechanics on which the method is based, rather than the equation of motion. The invention has recognized that the drive power $P_A$ can be determined merely via the engine torques $M_{eng}$, $M_{fric}$ by taking account of the angular velocity of the engine $\omega_{eng}$ with the aid of the means 6.

Various approaches are considered in the calculating means 2 for determining the mass m of the motor vehicle. If the device has suitable means 8 for determining the power $P_R$ for overcoming the driving resistances, said power $P_R$ is passed on to the calculating means 2. However, this requires that the individual driving resistances $F_L$, $F_R$, $F_{St}$ of the motor vehicle be known.

If this is not the case, a timer 10 is used to determine two instants $t_0$, $t_1$ which lie as close to one another as possible so that the driving resistances $F_L$, $F_R$, $F_{St}$ at both instants $t_0$, $t_1$ are substantially identical. To be specific, if the instants $t_0$, $t_1$ lie sufficiently close to one another it can be assumed that the driving resistances $F_L$, $F_R$, $F_{St}$ also have not changed substantially within this short time period.

The calculating means 2 are configured in such a way as to determine the mass m of the motor vehicle in accordance with Equation (9) from the speeds $v_0$, $v_1$ of the motor vehicle at the two instants $t_0$, $t_1$ and from the drive powers $P_{A0}$, $P_{A1}$.

In this case, moments of inertia of the rotating masses which are required for the determination of the rotational energy are estimated or stored as vehicle parameters.

In order to minimize the number of erroneous calculations of the mass m of the motor vehicle, it is preferable to apply a recursive estimation algorithm 11 in the calculating means 2 to determine the mass m. This is because, for example, the values for the mass m of the motor vehicle can be corrupted by noisy signals and/or by rapidly varying driving resistances. The recursive estimation algorithm 11 minimizes the error square of the estimation error. It is advantageous that in this case previous measured values also feature in the current estimation, which means there is more information available for the estimation.

One embodiment of the invention provides that the recursive estimation algorithm 11 is the least squares algorithm, also known as RLS algorithm. This algorithm is known per se to the person skilled in the art and is therefore not explained further here.

An alternative embodiment of the invention provides that the recursive estimation algorithm 11 is the Kalman algorithm. Said algorithm is likewise known to the person skilled in the art and is therefore not explained further here.

On the basis of the above named recursive estimation algorithm 11, which is applied in the calculating means 2 to determine the mass m of the motor vehicle, the mass m output by the calculating means 2 is already advantageously a measured value of high quality.

Said measured value for the mass m is passed on to a further means 12 for determining a mean value and stored, in order to minimize the risk of a faulty calculation, particularly due to outliers in the measured values.

Figure 2:
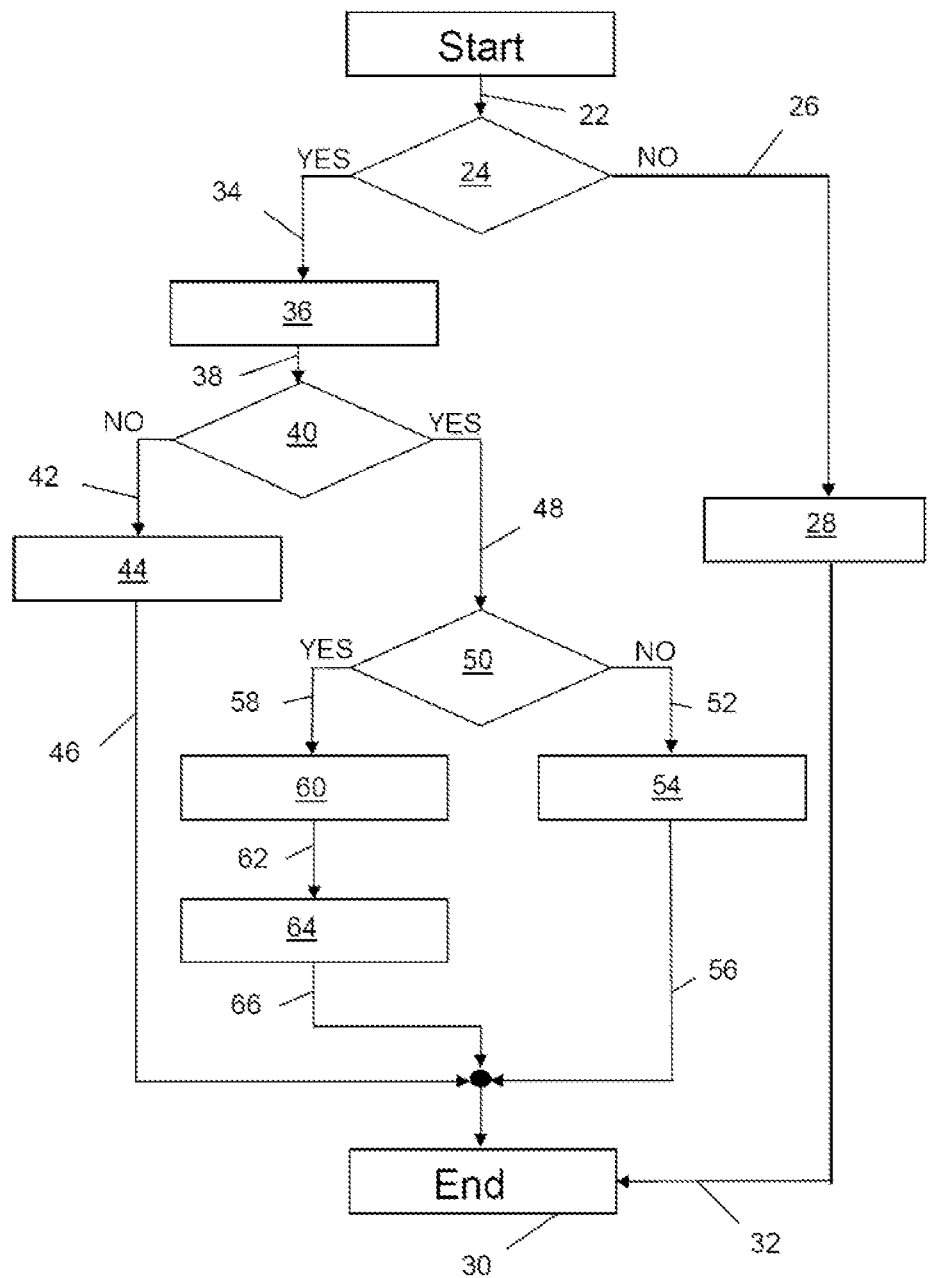
FIG. 2 shows a flowchart for explaining the formation of the mean value in accordance with the invention.

FIG. 2 shows a flowchart for explaining the formation of mean values applied in block 12 of FIG. 1. Via a connecting branch 22, the start icon is connected to a query icon 24 which queries whether three measured values are present for the mass m. As long as there are not three measured values available for the mass m, a no signal 26 is passed on to block 28, which signals waiting for further measured values for the mass m. The end icon 30 is reached via a connecting branch 32 from block 28, and the method can begin again.

If, however, it is recognized from the query icon 24 that three measured values are present for the mass m, a yes signal 34 is passed on to a block 36, in which a mean value is calculated from the three measured values. Said mean value is calculated by taking account of the variance of the individual measured values using the reciprocal of the variance as weighting factor.

In order to prevent outliers that may be present in the measured values of the mass m from corrupting the mean value to be formed, the mean value calculated in the block 36 is passed onto a query icon 40 via a branch 38. Here, it is checked whether at least one of the measured values of the mass m differs by a predetermined value from the mean value calculated in block 36.

If this is not the case, a no signal 42 is passed onto a block 44 in which the value to be output for the mass m of the motor vehicle is equated to the previously calculated mean value. The end icon 30 is then reached via a branch 46.

If, however, it is recognized from the query icon 40 that at least one measured value for the mass m differs from the mean value, a yes signal 48 is passed on to a further query icon 50. It is checked here whether only one measured value for the mass m differs significantly from the mean value.

If this is not the case, that is to say if more than one measured value differs significantly from the mean value, a no signal 52 is passed on to a block 54 in which the measured values for the mass m for said measurement path are discarded. The end icon 30 is subsequently reached via a branch 56, and the method can be started again.

In the case when only one measured value for the mass m differs significantly from the mean value, the query icon 50 passes on a yes signal 58 to a block 60. A new mean value is then calculated in the block 60 taking account of the variance from two remaining measured values of the mass m, that is to say the measured value which differs significantly from the previously calculated mean value is discarded.

The newly determined mean value is passed on by a branch 62 to a block 64, in which the value to be output for the mass m of the motor vehicle is equated to the newly determined mean value. The end icon 30 is then reached via a branch 66.

Once the end icon 30 is reached, the means 12 illustrated in FIG. 1 for determining a mean value of the previously determined value to be output for the mass m of the motor vehicle is output as averaged vehicle mass $\hat{m}$. Said estimated value $\hat{m}$ of the vehicle mass is preferably made available as input variable to a control algorithm of the motor vehicle. This can, for example, be an ABS or EBS controller. However, further controllers for which the vehicle mass is of interest are also possible to conceive.

A possible application of the method explained in accordance with FIG. 2 is the recognition of outliers in the estimation of the vehicle mass m. However, the method for forming a mean value can be applied in order to improve the accuracy of any static vehicle parameter. In this case, the parameters can be measured or be estimated by means of suitable algorithms. The accuracy of the vehicle parameters is advantageously improved with the method according to the invention by relatively simple calculation steps.

Since the calculation of the mass m of the motor vehicle is based according to the invention on the drive power $P_A$, the determination of the tractive force is advantageously eliminated. The method according to the invention can advantageously be used in the case of motor vehicles having conventional drivetrains as well as all-wheel and hybrid drives.

All the features named in the above description and in the claims can be combined both individually and in any desired combination with the features of the independent claims. The disclosure of the invention is therefore not limited to the combinations of features described and/or claimed. However, all reasonable combinations of features within the scope of the invention have to be regarded as disclosed. While the above description constitutes the preferred embodiments of the present invention, it will be appreciated that the invention is susceptible to modification, variation and change without departing from the proper scope and fair meaning of the accompanying claims.

LIST OF REFERENCE SYMBOLS (PART OF THE DESCRIPTION)

2 Calculating means
4 Means for determining the speed v
6 Means for determining the drive power $P_A$
8 Means for determining the power $P_R$ for overcoming the driving resistances
10 Timer
11 Recursive estimation algorithm 12 Means for determining a mean value
22 Connecting branch
24 Query icon
26 No signal
28 Block (wait)
30 End icon
32 Connecting branch
34 Yes signal
36 Block (mean value)
38 Branch calculated mean value
40 Query icon (outliers)
42 No signal
44 Block (assignment)
46 Branch to the end icon
48 Yes signal
50 Query icon
52 No signal
54 Block (discard measured values)
56 Branch to the end icon
58 Yes signal
60 Block (mean value)
62 Branch mean value
64 Block (assignment)
66 Branch to the end icon
$F_L$ Air resistance of the motor vehicle
$F_R$ Rolling resistance of the motor vehicle
$F_{St}$ Slope resistance of the motor vehicle
m Mass of the motor vehicle
m̂ Mean value of the mass m
$M_{eng}$ Drive torque of the engine
$M_{fric}$ Frictional torque of the engine
n Wheel rotational speed signal
$P_A$ Drive power
$P_{A0}$ Drive power at instant t=0
$P_{A1}$ Drive power at instant t=1
$P_R$ Power for overcoming the driving resistances
$t_0$ First instant
$t_1$ Second instant
v Speed of the motor vehicle
$v_0$ Speed at instant t=0
$v_1$ Speed at instant t=1
η Parameterized efficiency of the drivetrain
$\omega_{eng}$ Angular velocity of the engine

The invention claimed is:

1. A method for controlling a vehicle control system comprising the following steps:
   determining a speed (v) of the motor vehicle for two mutually different instants ($t_0$, $t_1$) separated by a time interval in which driving resistances ($F_L$, $F_R$, $F_{St}$) belonging to the instants ($t_0$, $t_1$) are assumed not to differ between the instants ($t_0$, $t_1$);
   determining drive powers ($P_{A0}$, $P_{A1}$) of the motor vehicle for the two instants ($t_0$, $t_1$), each of the drive powers ($P_A$) being determined as follows:

$P_A = (M_{eng} - M_{fric}) * \omega_{eng} * \eta$, with $P_A$ being one of the drive powers ($P_{A0}$, $P_{A1}$), $M_{eng}$ being a drive torque of the engine, $M_{fric}$ being a frictional torque of the engine, $\omega_{eng}$ being an angular velocity of the engine, and η being a parameterized efficiency of the drivetrain;
   determining an estimated mass (m) of the motor vehicle from the speeds ($v_0$, $v_1$) and from the drive powers ($P_{A0}$, $P_{A1}$) at the two instants ($t_0$, $t_1$);
   supplying electronic information representative of the estimated mass (m) to a vehicle control system, the vehicle control system being at least one of an anti-lock brake system or an electronically controlled brake system; and
   operating the vehicle control system based on the electronic information.

2. The method according to claim 1, wherein
   a power ($P_R$) for overcoming the driving resistances is determined, and
   the estimated mass (m) of the motor vehicle is further determined from the speed (v), a current drive power ($P_A$) and the power ($P_R$) for overcoming the driving resistances, the difference between the current drive power ($P_A$) and the power ($P_R$) for overcoming the driving resistances corresponding to the change in the kinetic energy of the motor vehicle.

3. The method according to claim 1 wherein
   the speed (v) of the motor vehicle is determined by means of a measured wheel rotational speed signal (n).

4. The method according to claim 1, wherein
   the power ($P_R$) for overcoming the driving resistances is determined from a sum of individual driving resistances ($F_L$, $F_R$, $F_{St}$) multiplied by the speed (v) of the motor vehicle.

5. The method according to claim 1, wherein
   the estimated mass (m) of the motor vehicle is determined from the speed (v) and a current drive power ($P_A$) by using a recursive estimation algorithm, wherein the recursive estimation algorithm is carried out by a Kalman filter or by a recursive least squares estimator (RLS filter).

6. The method according to claim 1, wherein
   a mean value (m̂) is formed from at least three measured values for the estimated mass (m) of the motor vehicle, the calculation of the mean value (m̂) being performed taking account of the variance of the respective measured values for the estimated mass (m) of the motor vehicle, the mean value (m̂) being supplied to the vehicle control system as the electronic information representative of the estimated mass (m).

7. An electronic processor for determining an estimated mass (m) of a motor vehicle, the device configured
   for determining a speed (v) of the motor vehicle for two mutually different instants ($t_0$, $t_1$) separated by a time interval in which driving resistances ($F_L$, $F_R$, $F_{St}$) belonging to the instants ($t_0$, $t_1$) are assumed not to differ between the instants ($t_0$, $t_1$),
   for determining drive powers ($P_{A0}$, $P_{A1}$) of the motor vehicle for the two instants ($t_0$, $t_1$), with each of the drive powers ($P_A$) being determined as follows:

$P_A = (M_{eng} - M_{fric}) * \omega_{eng} * \eta$, with $P_A$ being one of the drive powers ($P_{A0}$, $P_{A1}$), $M_{eng}$ being a drive torque of the engine, $M_{fric}$ being a frictional torque of the engine, $\omega_{eng}$ being an angular velocity of the engine, and η being a parameterized efficiency of the drivetrain, and
   for determining the estimated mass (m) from the speeds ($v_0$, $v_1$) and from the drive powers ($P_{A0}$, $P_{A1}$) at the two instants ($t_0$, $t_1$), the device comprising an interface for supplying electronic information representative of the estimated mass (m) to a vehicle control system, the vehicle control system being at least one of an anti-lock brake system or an electronically controlled brake system; and for causing the vehicle control system to operate based on the electronic information.

8. The electronic processor according to claim 7, further configured for determining a power ($P_R$) for overcoming driving resistances, wherein the device determines the estimated mass (m) from the speed (v), a current drive power ($P_A$) and further from the power ($P_R$) for overcoming the driving resistances.

9. The electronic processor according to claim 7, further configured for determining the estimated mass (m) of the motor vehicle by a recursive estimation algorithm, wherein the recursive estimation algorithm is carried out by a Kalman filter or by a recursive least squares estimator (RLS filter).

10. The electronic processor according to claim 7, further configured for determining a mean value ($\hat{m}$) from at least three different measured values of the estimated mass (m) of the motor vehicle, a variance of the measured values being taken into account in each case.

11. A motor vehicle comprising
 a vehicle control system, the vehicle control system being at least one of an anti-lock brake system or an electronically controlled brake system, and
 an electronic processor for determining an estimated mass (m) of the motor vehicle, the device configured
  for determining a speed (v) of the motor vehicle,
  for determining drive powers ($P_{A0}$, $P_{A1}$) of the motor vehicle for two instants ($t_0$, $t_1$), each of the drive powers ($P_A$) being determined as follows:

$$P_A = (M_{eng} - M_{fric}) * \omega_{eng} * \eta,$$

with $P_A$ being one of the drive powers ($P_{A0}$, $P_{A1}$), $M_{eng}$ being a drive torque of the engine, $M_{fric}$ being a frictional torque of the engine, $\omega_{eng}$ being an angular velocity of the engine, and $\eta$ being a parameterized efficiency of the drivetrain
  for determining the estimated mass (m) from the speed (v) and from the drive powers ($P_{A0}$, $P_{A1}$) at the two instants ($t_0$, $t_1$), and
  for supplying electronic information representative of the estimated mass (m) to the vehicle control system,
 wherein the vehicle control system is configured to operate based on the electronic information.

\* \* \* \* \*